Nov. 25, 1952     H. L. COMSTOCK     2,619,322
CAT HEAD
Filed March 5, 1949     2 SHEETS—SHEET 1
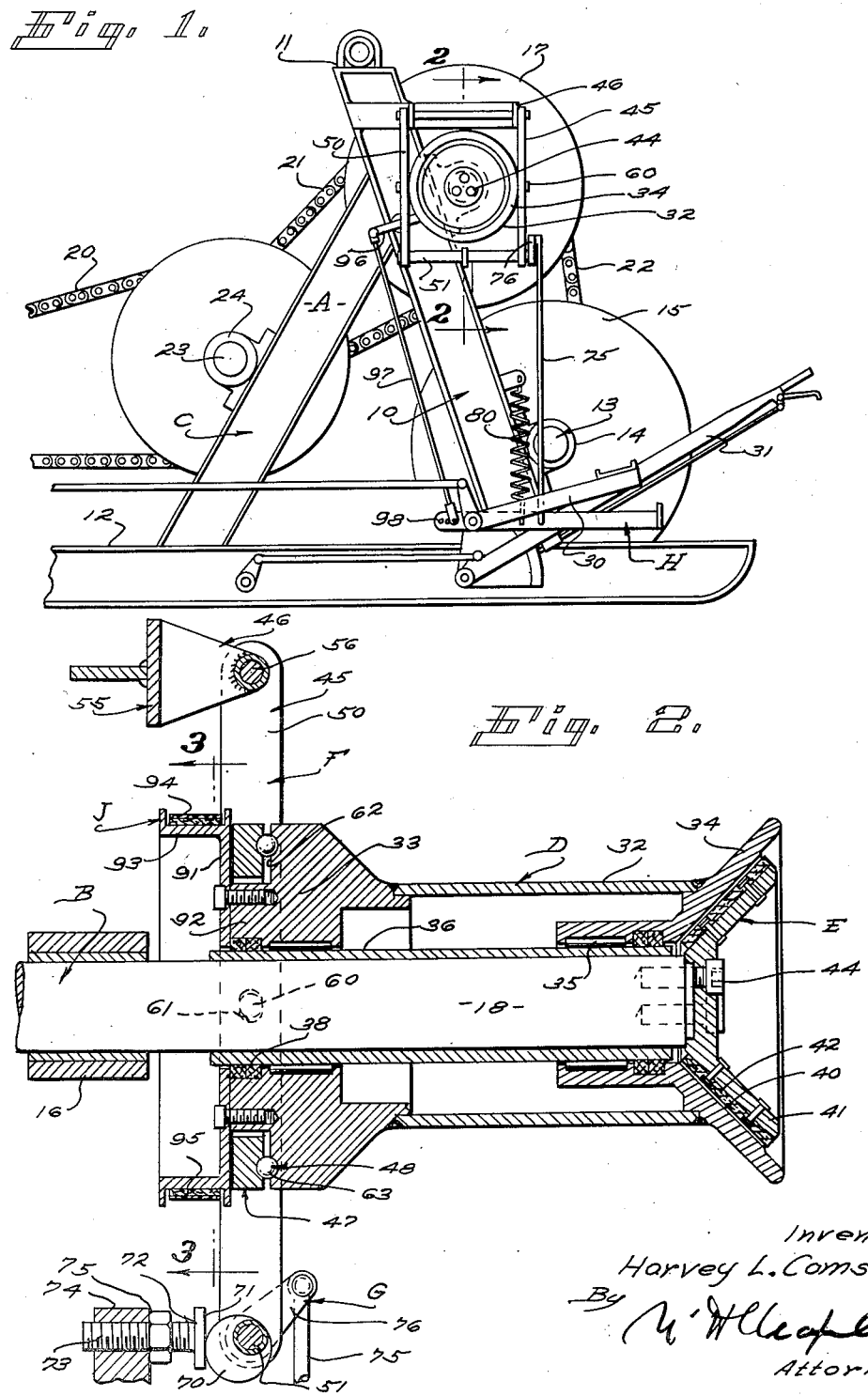
Inventor
Harvey L. Comstock
By
Attorney Nov. 25, 1952  H. L. COMSTOCK  2,619,322
CAT HEAD
Filed March 5, 1949  2 SHEETS—SHEET 2
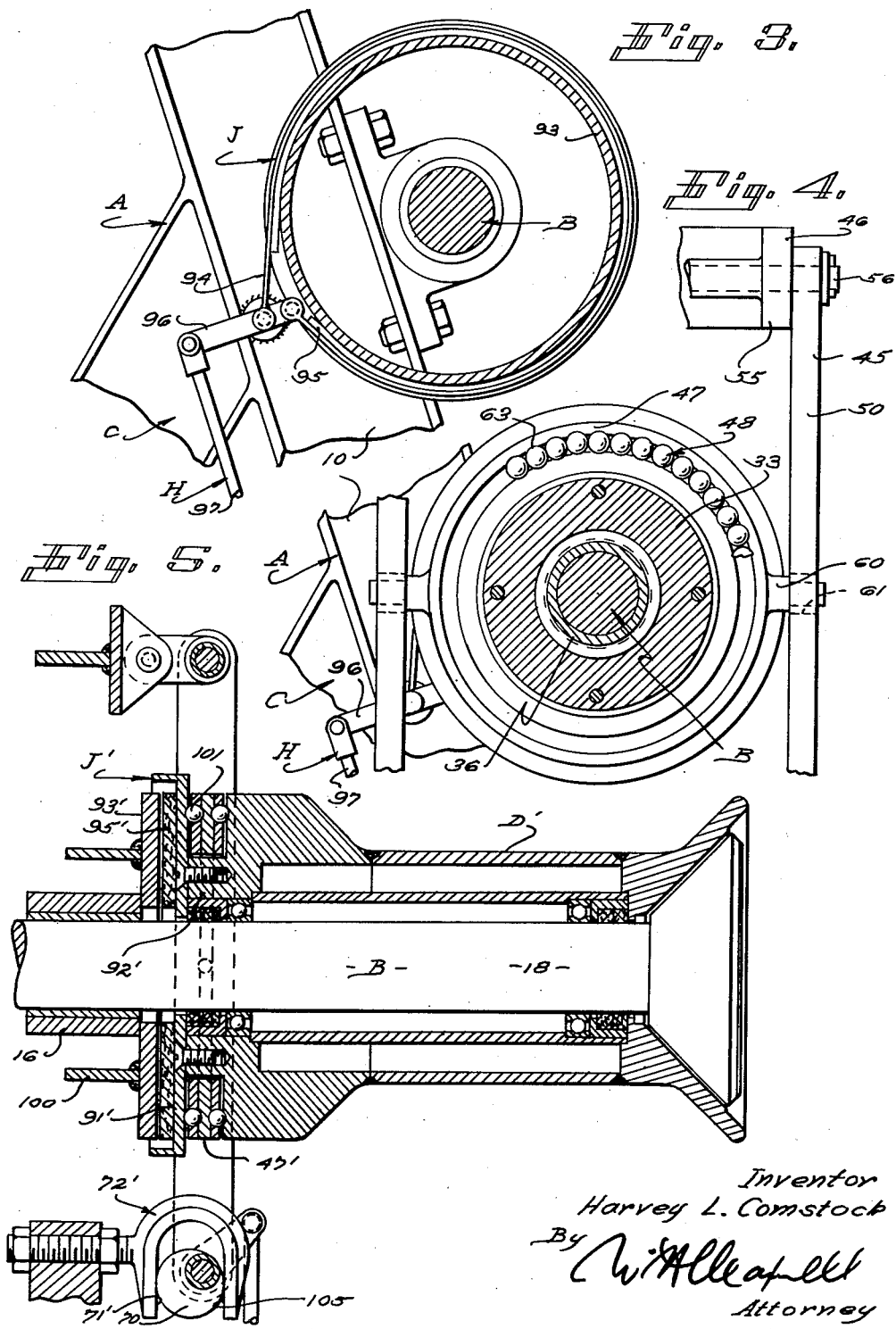
Inventor
Harvey L. Comstock
By
Attorney

UNITED STATES PATENT OFFICE 2,619,322

CAT HEAD

Harvey L. Comstock, Taft, Calif.

Application March 5, 1949, Serial No. 79,871

10 Claims. (Cl. 254—187)

This invention has to do with a cat head and is particularly concerned with a structure for use on or combined with a draw works useful in a derrick or the like, to handle well parts or equipment. It is a general object of the present invention to provide a cat head which is of simple, practical, dependable construction and which is very safe and convenient to operate.

Draw works are used in connection with the drilling and servicing of wells and the usual draw works involves, in addition to line handling parts, a rotating shaft which is equipped with a spool or cat head. The usual cat head is used for limited and special operations and ordinarily its use is momentary or for a limited period of time, and it is highly important that it be quickly releasable, as otherwise the operator or those working around the equipment are likely to be injured.

It is a general object of this invention to provide a cat head operatively coupled with a shaft or draw works through a clutch in such manner that the cat head is subject to convenient, dependable control by the operator.

Another object of the invention is to provide a cat head of the general character referred to in which the working parts are so arranged and related as to form a compact structure and so as to be effectively shielded or encased against injury or abuse.

A further object of the invention is to provide a cat head of the general character referred to subject to operation by a cam mechanism which is simple, positive and dependable in operation.

It is a further object of the invention to provide a cat head which includes a suitable control adapted for manual operation and which is so related to a draw works that the control is accessible to an operator positioned to actuate the controls of the draw works.

Another object of the invention is to provide a cat head of the general character referred to having, in combination, a clutch control and a brake, so that the cat head is either power operated or stopped and is not subject to operation when the control is not deliberately engaged.

The various objects and features of my invention will be fully understood from the following detailed description of typical preferred forms and applications of the invention, throughout which description reference is made to the accompanying drawings, in which:

Fig. 1 is an end elevation of a draw works embodying the present invention, showing the draw works from the end at which the operator is usually located and at which the draw works controls are assembled. Fig. 2 is an enlarged detailed sectional view taken as indicated by line 2—2 of Fig. 1, showing the clutch of the draw works disengaged. Fig. 3 is a detailed transverse sectional view taken as indicated by line 3—3 on Fig. 2. Fig. 4 is a fragmentary view of parts of the structure shown in Figs. 2 and 3, and Fig. 5 is a view similar to Fig. 2 illustrating a modified form of construction.

The present invention is primarily concerned with a cat head to be applied to or combined with a draw works such as is commonly employed in a rig for handling various parts and equipment. The particular draw works shown in the drawings is characterized by a frame A, a rotating shaft B, suitable braces C, and various other elements and working parts usually incidental to structure of this character.

The frame A is shown as a rigid stationary structure having spaced end standards 10 joined by a head beam 11 extending between the upper ends of the beam. The braces C extend from a base or skids 12 upwardly to join the standards 10 in the manner clearly illustrated in Fig. 1 of the drawings.

The particular draw works illustrated in the drawings involves two shafts, that is, the shaft B, which is the upper shaft of the structure, and a second or lower shaft 13. The shaft 13 is carried by bearings 14 on the standards 10 and supports a line carrying drum 15. The shaft B with which the present invention is concerned is carried by bearings 16 on the standards 10, and it supports a line carrying drum 17 between the standards and has a projecting end portion 18 projecting outward from or beyond the standard 10 that occurs at the end of the draw works where the operator normally stands.

The shafts or working parts of the draw works may be driven in any suitable manner from a suitable prime mover (not shown). In the case illustrated the driver is shown as involving chains 20, 21 and 22, and a countershaft 23 located at the rear of the draw works 24 carried on the braces C.

The various parts of the draw works illustrated in the drawings and thus far described, as well as other parts common to such structure, such as control clutches, etc. are responsive to controls preferably grouped where the operator normally stands. In the case illustrated the controls includes a foot lever 30 and a hand lever 31 and these controls are located at the end of the draw works where the shaft B has the projecting end portion 18.

The present invention provides, generally, a spool or cat head D on the projecting end portion 18 of shaft B, clutch means E acting between the shaft portion 18 and the cat head, an actuator F controlling the clutch E, operating means G for the actuator and operatively coupled with a control H, and a brake J also operatively coupled with the control H.

Referring first to the form of the invention shown in Figs. 1 to 4, inclusive, the cat head D is provided with a tubular line carrying body 32 which is concentrically disposed around the end portion 18 of shaft B, an inner end flange 33 projecting from the body 32, and an outer end flange 34 projecting from the outer end of the body. Suitable bearing means rotatably support the cat head on the shaft portion 18 and in accordance with the present invention the bearing means supporting the cat head are such as to not only allow for free rotation of the cat head relative to the shaft portion, but also for axial movement of the cat head relative to the shaft portion. In the particular case illustrated the cat head is mounted by means of anti-friction bearings involving annular series of rollers 35 at the ends of the cat head. In the particular case illustrated the rollers are shown as operating on a finished sleeve 36 which is tight on the end portion 18 of shaft B. Further, in the construction illustrated sealing means 38 are provided outward of or beyond the outer ends of the series of rollers 35 to exclude foreign matter from entering to impair operation of the rollers and to retain lubricant which may be introduced to the rollers in any suitable manner.

The clutch means E is preferably located at and confined to the outer end portion of the cat head D and it preferably involves a friction type clutch. The particular clutch illustrated is of the cone type, which involves, generally, a conical seat 40 at or in the outer end portion of the cat head, and a correspondingly shaped clutch plate 41 opposed to the seat and carried by the shaft portion 18. In the preferred form of the invention illustrated in the drawings the outer end portion of the cat head is recessed or in the form of a socket, where the conical seat 40 is located, and the conical plate of the clutch is located in or wholly confined to the socket in the cat head. A lining 42 of suitable friction material is carried by one of the clutch elements, say for instance, the plate 41, so that the desired frictional engagement is established between the plate and the cat head when the structure is operated as hereinafter described. In the structure illustrated the plate 41 is formed separate from the shaft 18 and is secured thereto by suitable screw fasteners 44.

With the construction just described and where the shaft B is rotatable but does not shift axially the clutch plate 41 rotates in a fixed position axially of the structure and the clutch E is engaged and disengaged by axial shifting of the cat head D. For instance, when the cat head is shifted outwardly on the shaft portion 18 the clutch is engaged, whereas when it is shifted inwardly the clutch is released.

The actuator F for the cat head serves as a means or mechanism by which the cat head can be shifted axially to effect the desired engagement or release of the clutch E. In the form of the invention illustrated the actuator F involves, generally, a yoke 45 carried by a pivotal support 46 and operatively connected with the cat head D through a thrust collar 47 and anti-friction means 48.

The yoke 45 has spaced sides 50 which straddle the collar 47 located concentric with shaft 18 and adjacent the outer side of flange 33 of the cat head D. A cross arm 51 connects the lower ends of the sides 50 below the collar and cat head, the cross arm 51 being preferably in the form of a bar or rod round in cross section for reasons that will be hereinafter apparent.

The pivotal mounting 46 of the yoke 45 is shown as involving a bracket 55 supported in fixed position by the frame A at a point above the inner end portion of the cat head, and a pivot pin 56 carried by the bracket 55 and holding the upper ends of the sides 50 so that the yoke is free to swing or pivot about the axis established by the pin 56. The axis established by the pin 56 is located above and is transverse of the axis of shaft B and it is preferred that the parts be arranged and related so that the sides 50 of the yoke embrace the thrust collar 47 when the yoke depends from the pivot pin 56, as shown in Fig. 2 of the drawings.

The thrust collar 47 is an annular member of substantial size coupled with the yoke through trunnions 60 which project from diametrically opposite sides of the collar and which are rotatably carried in openings 61 provided in the sides 50 of the yoke. The openings 61 are preferably extended somewhat lengthwise of the sides 50 so that the structure works without binding. With the general arrangement of parts thus far described shifting of the cross arm 51 of the yoke causes swinging of the yoke and consequent axial shifting of the thrust collar 47.

The anti-friction means 48 occurs between the thrust collar and the outer side 62 of the head flange 33. In the preferred form of the invention the thrust means involves an annular series of balls 63, as clearly shown in Figs. 2 and 4 of the drawings.

The operating means G for the actuator F is preferably a cam means suitably coupled with the control H. In the preferred arrangement the means G involves a cam 70 rotatably carried by the cross arm 51 of the yoke 45 to cooperate with the face 71 of a stop 72 supported in fixed position from the frame of the draw works. In the particular case illustrated the stop 72 is in the nature of an abutment provided with a stem 73 threaded to a part 74 fixed to the draw works frame and a stop nut 75 is carried on the threaded part 73 to set the stop or abutment in adjusted position.

In practice any suitable operating connection may be provided between the cam 70 and the actuator H. The actuator H is shown as a pivoted foot lever grouped with the controls 30 and 31 of the draw works, in which case it is convenient to couple the control H with the cam by means of a pull rod 75 and a lever arm 76. In the case illustrated the cross arm 51 of the yoke 45 is rotatable relative to the sides of the yoke and the cam 70 is fixed on the cross arm 51 while the lever arm 76 is fixed on one end of the cross arm 51. The pull rod 75 is pivoted to the arm 76 and to the foot lever forming the control H so that when the foot lever H is depressed by the operator the rod 75 operates under tension turning the lever 76 and consequently the cross arm 51 so that the cam 70 is rotated or operated relative to the face 71 of the stop 72. By suitably shaping the cam 71 its rotation, as above described, causes swinging of the yoke in such manner as to shift the head D, causing engagement of the clutch E. In the construction illustrated a suitable spring 80 is coupled with the control H to normally yieldingly hold it in an unactuated or elevated position, and when the operator releases the control H the spring returns the parts to the position shown in the drawings, where the head D is free to shift away from the plane 41 of the clutch, causing the clutch to release.

The brake J is located at the inner end of the cat head D and is provided with a shiftable or working part operatively coupled with the control H so that the brake is set or engaged when the control H is in the up or unactuated position. In the form of the invention under consideration the brake J is of the band type and is shown as including a brake plate 91 fixed relative to or on a boss 92 projecting from the inner end of the cat head through the thrust ring 47. A brake drum 93 projects from the peripheral portion of plate 91 and a suitable frictional band 94 cooperates with the drum. In the case illustrated the band is around the drum and is an element having a suitable frictional lining 95. The band is carried by or coupled to a pivoted lever 96 so that it is engaged or released by rocking or pivotal movement of the lever.

The desired operating connection between the operating lever 96 of the brake and the foot lever or control H is shown as including a pull rod 97 pivotally connected to a projecting portion 98 of the foot lever and to the brake lever 96. When the outer or foot end of the control H is up the projecting end 98 is down, causing the rod 98 to be pulled so that lever 96 is operated to a position where the brake band 94 is set. When the control H is operated or depressed the tension on the rod 97 is released and the rod is moved, up, causing the lever 96 to move so that the brake band is released. It will be apparent that through proper setting or synchronizing of the structure hereinabove described the cat head D is always under full and proper control of the control H, so that it is either stationary and held braked by the brake J or is being positively driven through the clutch E. It is to be understood that modification may be made in the connection between the operating lever 96 and foot lever in order to adapt the present invention to draw-works of different design and construction.

In the form of the invention shown in Fig. 5 of the drawings the brake J' is of the disc type instead of being of the band type above described. In this case the plate 91' of the brake carried by the boss 92' is opposed by a brake disc 93' supported in fixed position from the frame of the draw works by suitable brackets 100. A friction face 95' is carried by one of the parts, for instance, by the plate 91', so that when the cat head D is shifted axially causing the plate 91' to be thrust toward or against the disc 93' frictional engagement is established, causing the desired braking action. In this form of the invention it is desirable to provide a suitable thrust bearing or anti-friction means between the thrust collar 47' and the clutch plate 91'. This anti-friction means may be established by an annular series of balls 101 arranged between the collar 47' and the clutch plate. It is to be observed that this form of the invention is somewhat simpler than that first described, in that it eliminates certain working parts such as the brake lever 96 and the pull rod 97. To make this second form of the invention positive in operation, however, the stop 72' instead of having a single face engaged by the cam 70 has two opposed faces engaged by the cam, a face 71' corresponding to the face 71 first described, and an opposed face 105 also engaged by the cam. As the cam 70 is rotated to its normal or unactuated position it operates on or against the face 105 positively moving or swinging the yoke 45 so that the brake J' is engaged. The stop 72' may in this case be a yoke-like structure, as clearly illustrated in Fig. 5.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A structure applicable to a draw works having a projecting shaft, a cat head rotatably mounted on the shaft and shiftable axially thereof, a clutch at the outer end of the cat head including, a clutch face on the cat head and a clutch member fixed at the end of the shaft, a projection on the inner end of the cat head projecting axially thereof, a brake axially spaced from the inner end of the cat head and including an element carried by said projection and a part cooperating with said element, the said element and part operating relative to each other into and out of braking engagement, and operating means including, a collar surrounding the shaft and said projection and held between the inner end of the cat head and the said brake element, a fixed abutment, an arm, means pivotally supporting the arm at one end, an operating cam carried by the arm at its other end and engaging the abutment, and means connecting the collar and the arm intermediate the ends thereof whereby operation of the cam swings the arm and effects movement of the collar causing axial shifting of the cat head.

2. A structure applicable to a draw works having a projecting shaft, a cat head rotatably mounted on the shaft and shiftable axially thereof, a clutch at the outer end of the cat head including, a clutch face on the cat head and a clutch member fixed on the end of the shaft, a projection on the inner end of the cat head projecting axially thereof, a brake axially spaced from the inner end of the cat head and including, an element carried by said projection and part operated into and out of braking engagement with said brake element, an operating means including, a collar surrounding the shaft and projection and held between the inner end of the cat head and the said brake element, an arm, means pivotally supporting the arm at one end, a fixed abutment, an operating cam carried by the arm at its other end and engaging the cam, a coupling between the collar and the arm intermediate the ends thereof whereby operation of the cam swings the arm and effects movement of the collar causing axial shifting of the cat head, and a single means operating the cam and said brake part so that when one is operated the other is released.

3. A structure applicable to a draw works having a projecting shaft, a cat head rotatably mounted on the shaft and shiftable axially thereof, a clutch at the outer end of the cat head including, a clutch face on the cat head and a clutch member fixed on the end of the shaft, a projection on the inner end of the cat head projecting axially thereof, a brake axially spaced from the inner end of the cat head and including, an element carried by said projection and a part operated into and out of braking engagement with said brake element, and operating means including, a collar surrounding the said brake element, an arm having spaced side parts between which the collar is located, means pivotally supporting one end of the arm, a fixed abutment, an operating cam carried by the other end of the arm and engaging the abutment, a coupling between the collar and the side parts of the arm intermediate the ends thereof whereby operation of the cam swings the arm and effects movement of the collar causing axial shifting of the cat head, and a single means operating the cam and said brake parts so that when the clutch is engaged the brake is released and when the clutch is released the brake is engaged.

4. A structure applicable to a draw works having a projecting shaft, a cat head rotatably mounted on the shaft, and shiftable axially thereof, a clutch at the outer end of the cat head including, a clutch face on the cat head and a clutch member fixed at the end of the shaft, a projection on the inner end of the cat head projecting axially thereof, a brake axially spaced from the inner end of the cat head and including an element carried by said projection and a part cooperating with said element, the said element and part operating relative to each other into and out of braking engagement, and operating means including, a collar surrounding the shaft and said projection and held between the inner end of the cat head and the said brake element, an antifriction bearing interposed between the collar and the cat head, an arm, means pivotally supporting the arm at one end, a fixed abutment, an operating cam carried by the arm at its other end and engaging the abutment, and means connecting the collar and the arm intermediate the ends thereof whereby operation of the cam swings the arm and effects movement of the collar causing axial shifting of the cat head.

5. A structure applicable to a draw works having a projecting shaft, a cat head rotatably mounted on the shaft, and shiftable axially thereof, a clutch at the outer end of the cat head including, a clutch face on the cat head and a clutch member fixed at the end of the shaft, a projection on the inner end of the cat head projecting axially thereof, a brake axially spaced from the inner end of the cat head and including, an element carried by said projection and a part cooperating with said element, the said element and part operating relative to each other into and out of braking engagement, and operating means including, a collar surrounding the shaft and said projection and held between the inner end of the cat head and the said brake element, an arm, means pivotally supporting the arm at one end, cam means operating the other end of the arm, and means connecting the collar and arm intermediate the ends thereof whereby operation of the cam means swings the arm and effects movement of the collar causing axial shifting of the cat head, the cam means including, a fixed abutment and a cam rotatably supported on said other end of the arm and cooperatively engaging the abutment.

6. A structure applicable to a draw works having a projecting shaft, a cat head rotatably mounted on the shaft, and shiftable axially thereof, a clutch at the outer end of the cat head including, a clutch face on the cat head and a clutch member fixed at the end of the shaft, a projection on the inner end of the cat head projecting axially thereof, a brake axially spaced from the inner end of the cat head and including, an element carried by said projection and a part cooperating with said element, the said element and part operating relative to each other into and out of braking engagement, and operating means including, a collar surrounding the shaft and said projection and held between the inner end of the cat head and the said brake element, an arm, means pivotally supporting the arm at one end, cam means operating the other end of the arm, and means connecting the collar and arm intermediate the ends thereof whereby operation of the cam means swings the arm and effects movement of the collar causing axial shifting of the cat head, the cam means including an abutment, a mounting adjustably supporting the abutment, and a cam rotatably supported on said other end of the arm and cooperatively engaging the abutment.

7. A structure applicable to a draw works having a projecting shaft, a cat head rotatably mounted on the shaft and shiftable axially thereof, a clutch at the outer end of the cat head including, a clutch face on the cat head and a clutch member fixed on the end of the shaft, a projection on the inner end of the cat head projecting axially thereof, a brake axially spaced from the inner end of the cat head and including, an element carried by said projection and a part operated into and out of braking engagement with said brake element, and operating means including, a collar surrounding the shaft and projection and held between the inner end of the cat head and the said brake element, an arm, means pivotally supporting the arm at one end, a fixed abutment, an operating cam carried by the arm at its other end and engaging the abutment, a coupling between the collar and the arm intermediate the ends thereof whereby operation of the cam swings the arm and effects movement of the collar causing axial shifting of the cat head, and a single means operating the cam and said brake part so that when the clutch is engaged the brake is released and when the clutch is released the brake is engaged and said single means including, a pivotally mounted pedal, a spring normally yieldingly holding the pedal in an elevated position, a link connecting the pedal and cam, and a link connecting the pedal and said brake part.

8. A structure applicable to a draw works having a projecting shaft, a cat head rotatably mounted on the shaft, and shiftable axially thereof, a clutch at the outer end of the cat head including, a clutch face on the cat head and a clutch member fixed at the end of the shaft, a projection on the inner end of the cat head projecting axially thereof, a brake axially spaced from the inner end of the cat head and including an element carried by said projection and a part cooperating with said element, the said element and part operating relative to each other into and out of braking engagement, and operating means including, a collar surrounding the shaft and said projection and held between the inner end of the cat head and the said brake element, an arm, means pivotally supporting the arm at one end, a fixed abutment, an operating cam carried by the arm at its other end and engaging the abutment, and means connecting the collar and the arm intermediate the ends thereof whereby operation of the cam swings the arm and effects movement of the collar causing axial shifting of the cat head, the said brake element having a drum portion and said brake part including a band engaged with the drum.

9. A structure applicable to a draw works having a projecting shaft, a cat head rotatably mounted on the shaft, and shiftable axially thereof, a clutch at the outer end of the cat head including, a clutch face on the cat head and a clutch member fixed at the end of the shaft, a projection on the inner end of the cat head projecting axially thereof, a brake axially spaced from the inner end of the cat head and including an element carried by said projection and a part cooperating with said element, the said element and part operating relative to each other into and out of braking engagement, and operating means including, a collar surrounding the shaft and said projection and held between the inner end of the cat head and the said brake element, an arm, means pivotally supporting the arm at one end, a fixed abutment, an operating cam carried by the arm at its other end and engaging the abutment, and means connecting the collar and the arm intermediate the ends thereof whereby operation of the cam swings the arm and effects movement of the collar causing axial shifting of the cat head, said brake element including a plate fixed to the projection and projecting radially therefrom and engaged by the collar and a drum concentric with the shaft and cat head and projecting axially from the plate and said brake part including a band engaged with the drum.

10. A structure applicable to a draw works having a projecting shaft, a cat head rotatably mounted on the shaft, and shiftable axially thereof, a clutch at the outer end of the cat head including, a clutch face on the cat head and a clutch member fixed at the end of the shaft, a projection on the inner end of the cat head projecting axially thereof, a brake axially spaced from the inner end of the cat head and including an element carried by said projection and a part cooperating with said element, the said element and part operating relative to each other into and out of braking engagement, and operating means including, a collar surrounding the shaft and said projection and held between the inner end of the cat head and the said brake element, an arm, means pivotally supporting the arm at one end, a fixed abutment, an operating cam carried by the arm at its other end and engaging the abutment, and means connecting the collar and the arm intermediate the ends thereof whereby operation of the cam swings the arm and effects movement of the collar causing axial shifting of the cat head, said brake element including an annular plate fixed to the projection and projecting radially therefrom and surrounding the shaft and said brake part including a fixed plate parallel with and opposed to said annular plate.

HARVEY L. COMSTOCK.

REFERENCES CITED

The following references are of record in the file of this patent:

UNITED STATES PATENTS

| Number | Name | Date |
| --- | --- | --- |
| 1,755,728 | Foster | Apr. 22, 1930 |
| 2,014,683 | Hubert | Sept. 17, 1935 |
| 2,300,122 | Kelley | Oct. 27, 1942 |
| 2,355,861 | Harlin | Aug. 15, 1944 |
| 2,445,116 | Huston | July 13, 1948 |